United States Patent [19]

Wilkins, Jr.

[11] 4,079,968
[45] Mar. 21, 1978

[54] NONAMBIENT TEMPERATURE PIPELINE/JOINT ASSEMBLY

[75] Inventor: William E. Wilkins, Jr., Madison, N.J.

[73] Assignee: Exxon Research & Engineering Co., Linden, N.J.

[21] Appl. No.: 646,270

[22] Filed: Jan. 2, 1976

[51] Int. Cl.² ............................................. F16L 59/14
[52] U.S. Cl. ..................................... 285/47; 285/317; 285/332.3; 285/187
[58] Field of Search .................. 285/47, 187, 332.2, 285/332.3, 317, 374, 347, 332, 351, 352, 54; 138/113, 114

[56] References Cited

U.S. PATENT DOCUMENTS

| 1,366,634 | 1/1921 | Clark | 285/319 X |
| 1,985,325 | 12/1934 | Nathan | 285/374 X |
| 2,451,146 | 10/1948 | Baker et al. | 285/47 X |
| 2,795,398 | 6/1957 | Rogland | 285/332.3 X |
| 3,530,680 | 9/1970 | Gordner | 285/286 X |
| 3,556,567 | 1/1971 | O'Connor | 285/332.3 |
| 3,575,445 | 4/1971 | French | 285/47 |

FOREIGN PATENT DOCUMENTS 1,219,145  12/1959  France ................................ 285/374

Primary Examiner—Dave W. Arola
Attorney, Agent, or Firm—F. Donald Paris

[57] ABSTRACT

A joint assembly for a nonambient temperature pipeline which in a preferred embodiment is designed for low temperature service, comprising a slip-lock joint including inner and outer spool members connected with upstream and downstream pipeline segments, respectively, and contacting primary seals with sloping surfaces arranged so that as the pipeline temperature is lowered from ambient, the line contracts thereby causing the spools to move relative to each other and progressively increasing the tightness of the primary seal. During movement, a spring-loaded shear key locks in place in a shear key receiving slot, which is maintained after the initial cooldown of the pipeline. This maintains the tightness of the joint and accommodates any further contraction movements in the pipeline.

19 Claims, 18 Drawing Figures

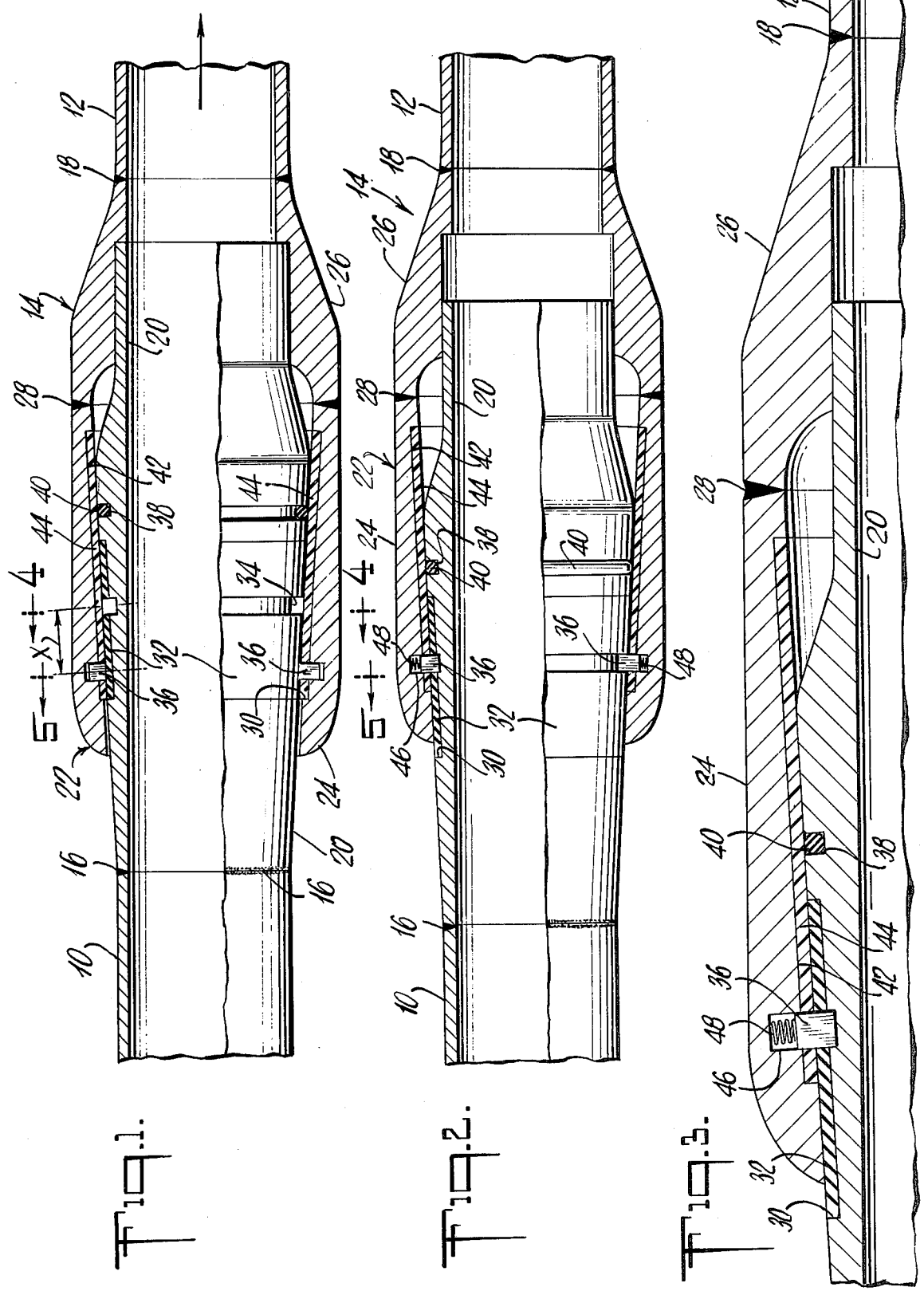

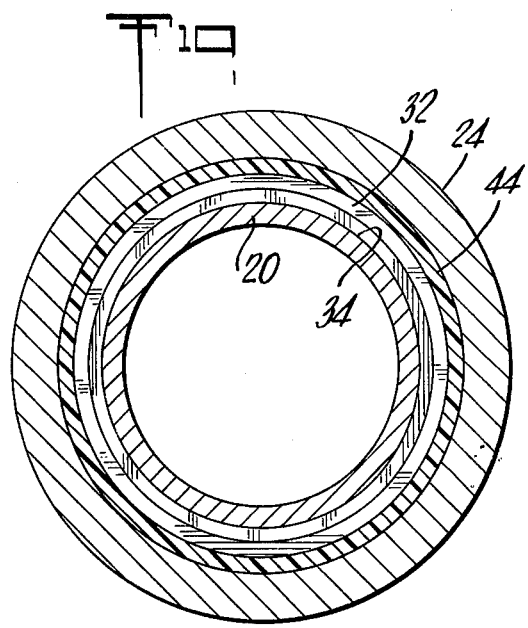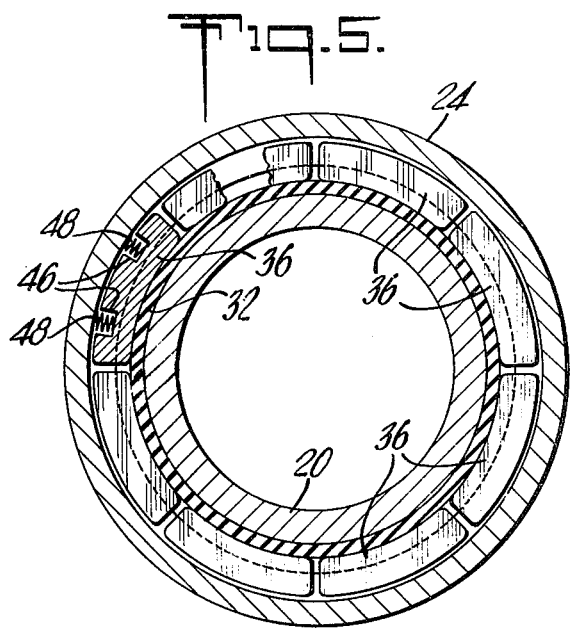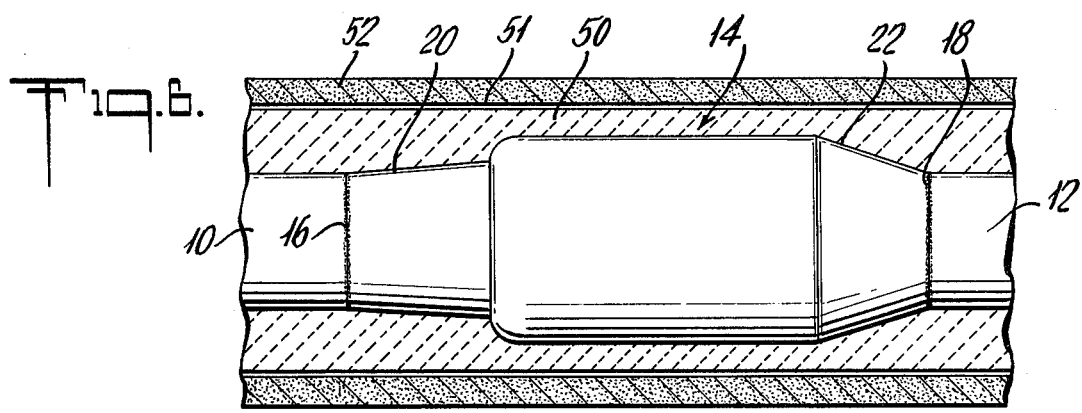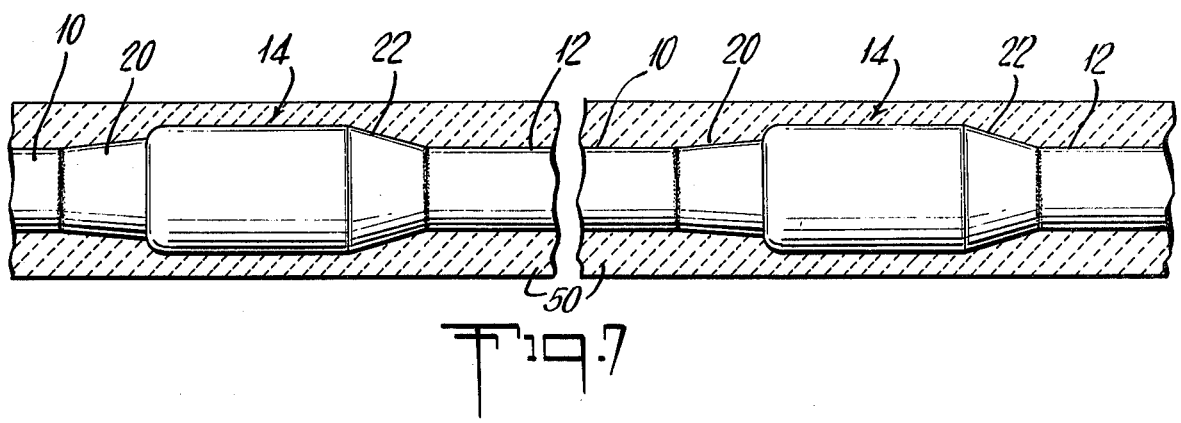

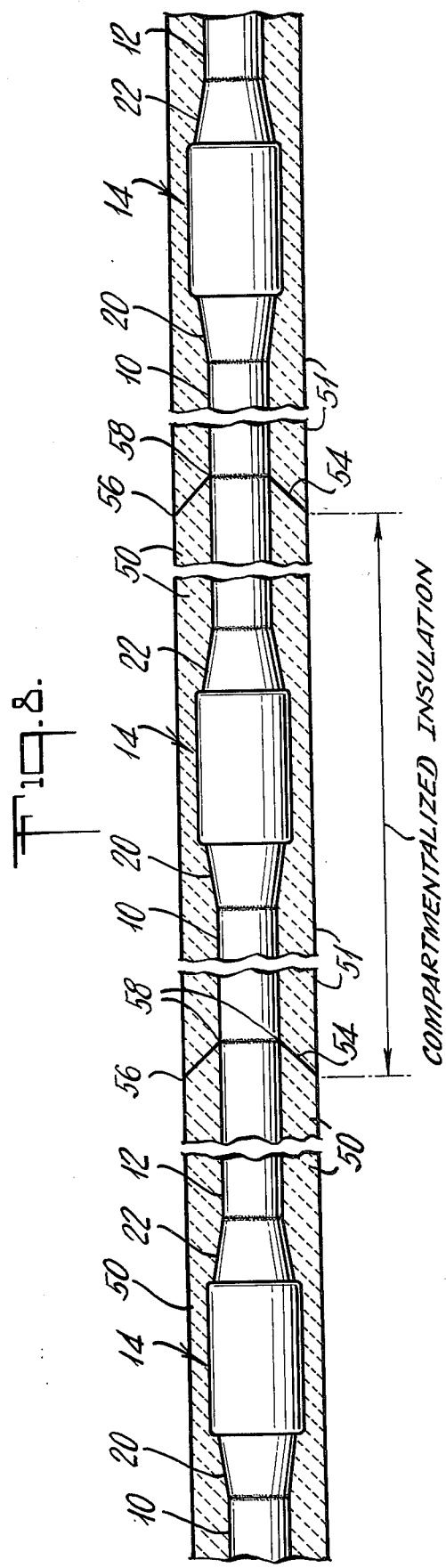

NONAMBIENT TEMPERATURE PIPELINE/JOINT ASSEMBLY

BACKGROUND OF THE INVENTION

It is well established that pipelines employed in connection with low temperature service, e.g., in the transport of products such as butane, ammonia, propane, ethane, ethylene, methane, etc., in cold liquid form, generally require suitable devices to absorb changes in line length as a result of temperatures introduced by such service. Typically, such pipelines are installed at ambient temperatures. Products like those above are typically transported in cold liquid form at much lower temperatures, e.g., at or near +30° F. for butane, −28° F. for ammonia, −44° F. for propane, −128° F. for ethane, −155° F. for ethylene, −259° F. for methane, etc. The different temperatures, i.e. ambient versus cold-liquid, commonly bring about significant changes in line length on pipeline commissioning as a result of pipeline thermal contraction. During normal operations such lines generally undergo lesser thermal movements in response to relatively small temperature changes related to fluctuations in ambient conditions, product compositions, or pressures.

Above ground, it is commonplace to employ in such lines loops and bellows arrangements to absorb the relatively large initial contraction movements that attend commissioning and the generally smaller movements that accompany normal operations. Each of these types of devices provides for such pipeline movements by compensatory movements by the devices themselves. To provide for this capability in loops normally demands relatively large amounts of unrestricted space inside which the loops can function. To provide for this capability in bellows normally demands that the bellows possess relatively thin walls and also a measure of unrestricted space for functioning.

Because of these requirements neither loops nor bellows are completely satisfactory for pipelines for low temperature service which must be buried underground or submerged in water. In these environments without surrounding protection, earth, sediments, growths, etc., can cause such devices to malfunction. When loops or bellows are rendered incapable of providing their intended compensatory movements, stress levels in the pipelines involved are affected and can rise to unacceptable levels. Theoretically, protective enclosures, e.g., vaults, can be installed around loops inground or underwater to prevent their being fouled. However, loops inherently lack compactness; such enclosures tend to be large and uneconomic. Bellows are by comparison compact and relatively easy to protect from external fouling; however, the characteristically thin walls of bellows are vulnerable to excesses of internal pressure and to temperature-related cyclically induced fatigue.

At present alternatives to the use of such devices involve restraint and prestress systems. In concepts involving restraint, pipelines susceptible to longitudinal shrinkage, or shortening, as a result of temperature drops, are literally restrained from shrinking or shortening. Such restraint of shrinkage causes longitudinal pipeline stress. With full restraint and too large a temperature drop such stress can cause pipeline ruptures. In prestress systems a reverse pattern of longitudinal stress must be locked into lines prior to commissioning. Generally, special restraint systems or anchorages and special prestressing devices are necessary to accomplish this end.

Pipelines for low temperature service commonly require insulation to retard influx of heat and consequent boil-off of product. Water impermeable cover over the insulation must be provided generally when such lines are buried underground (because of the usual presence of moisture) and especially when such lines are submerged directly in water (generally referred to as submarine lines), since present forms of insulation lose resistance to heat flow on infiltration by water. The deployment of such insulation and protective cover is made complex around bellows and loops by their configurations and required patterns of movement. The primary purpose of such insulation is compromised to varying extents in most restraint and prestress systems since, in most, the restraint or anchorage mechanisms extend to the cold liquid carrier and thereby provide direct conductance paths for flow of heat to the carrier and hence to the liquid.

With consideration for the above, the subject invention is directed to mechanisms which are stronger than bellows, more compact than loops, generally adaptable to fitting within a smooth outside impermeable cover insulation, e.g., a continuous carbon steel outer casing, with minimal presence of intervening heat conductors (between carrier and casing).

In connection with the subject invention, prior art which can be referred to for detailed discussions and analysis of the problems associated with cold temperature service pipelines, especially for undersea use, can be found in an article entitled "Prestress Piping System Favored for LNG Transport", *The Oil and Gas Journal,* pages 179 through 182, Apr. 1, 1968, by M. B. Gardner, Jr., and also in Gardner's U.S. Pat. No. 3,530,680. Other prior patents include: U.S. Pat. No. 3,379,027; U.S. Pat. No. 3,388,724; U.S. Pat. No. 3,547,161; U.S. Pat. No. 3,693,665 and Canadian Pat. No. 861,306.

SUMMARY OF THE INVENTION

The present invention relates to pipelines and more particularly to a joint assembly for pipelines, preferably those which are in cold service and contract or shrink as a result of temperature changes. In accordance with the present invention, the joint is stronger than joints heretofore known for such pipelines, and, is compact thus requiring minimal and restricted space, which permits its use inside an outer casing which will protect any insulation when the line is buried or submerged. The joint, which is of sliplock variety, is made primarily in the shop and includes an inner spool and an outer spool connected respectively to opposing adjacent ends of the pipeline segments. The joint includes primary seals which are in surface contact and arranged to provide progressively increased tightness as pipeline contraction occurs. After the seals move a predetermined amount due to the contraction, the components of the joint lock in position, thus preserving the primary seal arrangement and allowing any residual or additional movements to be taken up in pipeline tension or compression without causing the seals to open. The spools are maintained in locked relationship once they move relative to one another by means of spring-loaded shear keys which lock in place in shear key slots. The locked shear keys provide for contraction movements in excess of that initially designed for slip movements in the joints to be absorbed in pipeline tension on cool-down of the line. Such tension in the pipeline can be kept relatively small by taking into account in the initial design the total amount of line shrinkage which is expected to result and providing for the majority of this to be taken in total slip movement by a number of joints. When used with an outer casing, such as carbon steel pipe, with insulation between it and the fluid carrier pipe, and an outside concrete jacket, which is typical for submerged installations the line and joints will have sufficient lateral support to resist any buckling and be conducive to absorption of large compressive forces such as might occur on line decommissioning.

The advantages, nature, construction and arrangement and operation of the present invention will be apparent upon consideration of the illustrated embodiments described in detail herein in connection with the accompanying drawings.

BRIEF DESCRIPTION OF THE DRAWINGS

FIG. 1 is a partial cross-sectional view of a joint assembly for a pipeline in accordance with the present invention, under ambient conditions;

FIG. 2 is a partial cross-sectional view of the joint assembly of FIG. 1 after pipeline contraction has taken place due to a temperature change from ambient to a lower temperature;

FIG. 3 is an enlarged view of the top portion of the joint assembly of FIG. 2, showing the shear key in place in the shear key slot;

FIG. 4 is a cross-sectional view taken substantially on the line 4—4 of FIG. 1.

FIG. 5 is a cross-sectional view taken substantially on the line 5—5 of FIG. 1;

FIG. 6 is a schematic of the joint assembly according to the present invention encased in insulation and having outer protective coatings.

FIG. 7 is a schematic of a pipeline having a series of spaced joints according to the present invention; and FIG. 8 is a schematic of a pipeline having a series of spaced joints and compartmentalized insulation, according to the present invention.

DESCRIPTION OF THE PREFERRED EMBODIMENT

Referring now to the drawings wherein like reference numerals are used throughout the several views to designate the same components, there is shown in FIG. 1 a portion of a pipeline having an upstream pipeline segment 10 and a downstream pipeline segment 12. The flow of product in the pipeline is in the direction shown by the arrow. Typical products which can flow through the line are butane, ammonia, propane, ethane, ethylene, methane at temperatures ranging from +31° F. to −259° F. and lower. The opposing pipeline ends of the downstream and upstream segments are connected by a joint assembly generally designated 14. The assembly is of the "slip-lock" type, i.e., slip occurs first and is followed by a locking action. These joints will be spaced along the length of the line (e.g., see FIG. 7) and depending upon the product contemplated for transport through the line, the number of joints required can be determined taking into consideration the normal length of the various pipeline segments which they will interconnect and the amount of line shrinkage. The joint can substantially be completely fabricated in a shop and connected to the pipeline segments 10 and 12 by field welding as shown at 16 and 18. This has the advantage of permitting quick replacement of a faulty joint since joint assemblies can be on hand for quick repair jobs.

The assembly 14 comprises an inner metal spool member 20 which is welded (see weld 16) at one end to the upstream pipe segment 10 and extends toward the downstream pipe segment 12, terminating short of the field weld connection 18. An outer metal spool member 22 partially overlies the inner spool and comprises an upstream portion 24 and a downstream portion 26 which as a unit are connected by the field weld 18 to the downstream segment 12 and extend toward the upstream segment 10 in coaxial overlying relationship relative to the inner spool 20, terminating a distance from the upstream end of the inner spool. The outer spool 22 typically is made in two portions with a shop weld 28 connecting the halves to facilitate the assembly of outer spool 22 over inner spool 20. The outer surface of the inner spool slopes radially outward with respect to the pipeline axis in a downstream direction and spaced downstream a short distance from the field weld 16 includes a recess 30 which preferably is continuous about the periphery of the inner spool. The recess 30 has a primary seal 32 disposed therein, the purpose of which will become apparent. Within the recess is provided an annular slot or groove 34, preferably continuous, which is designed to receive an annular shear key 36, the details of which will be described hereinafter. Further downstream of the shear key slot 34 is a further annular groove or slot 38 which has a secondary annular seal 40 located therein. The radial outward slope terminates slightly downstream from the secondary seal slot 38, whereupon it gradually tapers radially into a planar surface substantially parallel to the pipeline surface and axis. The upstream portion 24 of the outer spool 22 is provided about its inner surface with a continuous annular recess 42 (slightly largr than the recess 30 for eventual accommodation of primary seal 32 and secondary seal 40), which receives a primary seal 44. This overlying portion has a slope complementary to that of the inner spool. Near the upstream end of the recess 42 is a notch or slot 46 which may be continuous for receiving the shear key 36, typically made of steel. This key 36 extends through the primary seal 44 in sliding or rolling contact with the seal 32 and is urged in a radially inward direction by means of a spring 48 which abuts between the key 36 and the inner surface of the notch 46. Under ambient conditions, as shown in FIG. 1, the spring 48 will bias the shear key 36 against the outer surface of the primary seal 32 disposed in the inner spool recess 30. In accordance with the present invention, the joint is installed in place under normal ambient temperature (i.e., at prevailing climatic temperatures) and thus will appear substantially as shown in FIG. 1. Upon the completion of the installation and connection of the joints to individual pipe segments the line is cooled slowly with a cold gaseous medium at a relatively low pressure such as cold gaseous nitrogen in order to initiate contraction of the system. The presence of the secondary seal 40 in contact with the outer spool primary seal 44 permits such low pressure cool-down to take place because the two together form a slip seal at low pressure. As cooldown occurs, that is, going from ambient to a lower temperature (i.e. ultimately to the temperature of the cold product to be transported), and with the downstream and upstream pipe segments being anchored in place by suitable conventional restraining means such as pipeline end anchors (or intermediate restraints as shown in FIG. 8), the change in temperature will cause the inner and outer spools to be drawn apart, that is, caused to move in opposite directions.

Thus, the inner spool 20 will tend to contract with the upstream pipe segment 10 to the left, while the outer spool 22 associated with the downstream pipe segment 12 will contract to the right. Having knowledge of the particular product to be employed and the amount of cooldown desired, there will be a predetermined amount of movement "x" between the inner and outer spools. This will occur with sliding contact between the adjacent faces of the primary seals 32 and 44 and between secondary seal 40 and primary seal 44. The sloping surfaces in which the seals are located will cause the primary seal components to become progressively tighter as the inner and outer spools are drawn apart by reason of the contraction of the pipeline. The degree of slope of these surfaces can, of course, be varied in order to match the different relative elasticities of the inner and outer spool and the different compressibility characteristics of the material used for the primary seals. Typical material for the seals would be TEFLON or KELF; however, other materials such as lead or similar soft materials may also be employed. The degree of slope and the amount of slip "x" also can be varied in order to accommodate the different known temperatures of the various cold low temperature products such as LNG (methane), LPG (butane and propane), ethylene, ammonia and the like, and also to accommodate the contraction characteristics of the different spool and pipeline materials. Upon movement of the inner spool and the outer spool relation to each other by the slip amount "x", the spring-loaded shear key 36 will lock in place in the shear key slot 34. The shear key itself may comprise a plurality of annular segments for ease of assembly and the segments may be designed or sliding or rolling and also the slot itself may be continuous or segmented as desired. After the relative movement is completed, the joint assembly will appear as shown in FIGS. 2 and 3.

It is not necessary in designing the slip amount "x" to account for all the contraction movements that will occur on pipeline cooldown and, in fact, it may be desirable to allow for excess of contraction movement in order to insure proper seating of the shear key in its slot. Once the key 36 is located in the slot 34, this will maintain the relative positions of the inner and outer spools which would preserve the primary seal relationship and tightness of the joint. The locked shear key will allow any contraction movements in excess of that designed for (in excess of "x") to be absorbed in pipeline tension. When the pipeline warms up due to fluctuations in ambient conditions, product compositions, or pressures or on decommissioning, the key will remain locked in place and will allow any expansion movements to be absorbed in pipeline compression.

While the bias on the shear key has been shown in the preferred embodiment as a conventional helical spring, it also is possible to employ other biasing arrangements, for example, leaf springs or a corrugated annular member, which urges the shear key radially inwardly for locking engagement with the slot 34 when radially aligned therewith. The slot and key positions may also be reversed. Other variations in the assembly may include spherical bearings to induce shear key rolling rather than sliding over contact surfaces of primary seals.

In FIG. 6, the joint assembly according to the present invention is shown in a preferred embodiment with insulation 50 surrounding it and the line and including further outer protective coatings 51 and 52 around the insulation which in the case of a submarine line (that is, one located underwater) typically comprises a water impermeable barrier, e.g., a continuous carbon steel pipe 51 and a concrete jacket 52 for negative buoyancy.

FIG. 7 illustrates a series of joints 14 connecting various segments of the line. If the line is merely buried underground, concrete is not necessary, but rather an appropriate protective barrier which would prevent penetration of the insulation by moisture, such as by way of example, a carbon steel pipe, or fiberglass and epoxy wrap, or other suitable construction can be provided.

The use of spool arrangements as disclosed for interconnecting opposing ends of pipe segments, combined with appropriate end anchorages of the line, will provide full control of longitudinal shrinkage of the pipe. As illustrated in FIG. 8, the use of spool arrangements 14 as disclosed heretofore for interconnecting opposing ends of pipe segments, together with bulkhead-like restraints 54 between the fluid carrier and the outside impermeable steel casing 51 after every one or more such spools, will provide for compartmentalized protection of insulation and for minimal need of end anchors. A typical section of compartmentalized insulation, as best illustrated in FIG. 8, is captured between the bulkhead restraints 54 located on opposite sides of joint 14, although more than one joint can be located between the restraints depending upon the system design and requirements. Each bulkhead-restraint typically comprises a truncated conically-shaped annular steel plate as shown in FIG. 8. Alternatively, the bulkhead-restraint can comprise a flat diaphragm annular steel plate perpendicularly disposed with respect to the longitudinal axis of the pipeline, with transverse extending gussets at the outer casing connection between the plate and the outer casing in order to restrain longitudinal movement. Another possible design can comprise turning down the ends (inwardly toward the longitudinal axis) of the outer casing to form the bulkhead restraint at appropriate locations along the line. The restraints are welded circumferentially at their outer periphery to the outer casing 51 as shown at 56 and at their inner periphery are circumferentially welded to the inner carrier pipe as shown at 58. While the bulkhead-restraints are illustrated as being oriented at an appropriate angle with respect to longitudinal axis of the pipeline, which is done in order to provide for the desired localization of stress distribution, this also can be accomplished by providing the alternative flat steel plates as discussed above. A particular angle selected is dependent upon the length of conductive path between the fluid carrier and the outer casing in order to minimize undesirable heat flow and provide the optimum local stress distribution desired. A combination of the various types of bulkhead restraints also is within the scope of this invention. By compartmentalizing the insulation as disclosed, the effect on insulation of any cut through the outer casing at any point in the line, thus cannot go beyond the single joint or spools if there is more than one in which the cut is located. This makes it feasible to decommission a line spool and replace it without affecting the remainder of the line, since replacement can be accomplished by providing newly-fabricated spools or joints assemblies which are in the same state as the other components of the system. Also, considerable advantage is provided to an operating line since an inadvertent casing leak allows water to infiltrate and ultimately deteriorate all the insulation in a particular spool which would only nominally increase the overall pipeline heat influx and product boil-off in a long line comprised otherwise of many intact spools. If there were no significant mechanical pipeline damage resulting therefrom, then that single casing leak in all likelihood could be tolerated for an indefinite period and depending upon the debit value of any increased boil-off, several such leaks could also probably be tolerated for a short term. A spool according to this invention can normally be fabricated with all the necessary welds being done in the shop. If necessary, one or more of the spools connected in the line can easily be replaced with a new prefabricated spool which is made under similar conditions.

While a preferred embodiment of the present invention has been shown and certain variations mentioned, further modifications and variations in the construction and/or arrangement of the invention may present themselves to those skilled in the art upon a reading of this disclosure. It is intended that such variations and/or modifications fall within the scope of the present invention which is better defined by reference to the appended claims.

What is claimed is:

1. A joint assembly for interconnecting pipeline segments of a nonambient temperature pipeline through which cold liquid flows, comprising: inner spool means connected to a first of said segments and outer spool means connected to a second of said segments and at least partially overlying said inner spool means in coaxial relation thereto; said inner spool means having an outer circumferentially disposed sloping surface which increases radially outward of the pipeline axis in the direction of flow, and said outer spool means having an inner sloping surface which is complementary to and overlies said outer sloping surface of said inner spool means; primary seal means operably disposed between said sloping surfaces of said inner and outer spool means; and locking means normally disposed in a first position when said segments are at ambient temperature and movable to a second locked position when said temperature of said pipeline segments goes from ambient to a cold temperature for securing said inner and outer spool means in locked position, said inner and outer spools contracting as said temperature becomes colder for progressively increasing the tightness of said primary seal means.

2. The joint assembly of claim 1 wherein said inner sloping surface of said outer spool means is circumferentially disposed and decreases radially inward relative to the pipeline axis in the direction opposite to the flow.

3. The joint assembly of claim 2 wherein said outer sloping surface includes a recess including first primary seal means and said inner sloping surface includes a recess including second primary seal means in sliding contact with said first primary seal means.

4. The joint assembly of claim 3 wherein said second recess is longer than said first recess in the axial direction.

5. The joint assembly of claim 4 including secondary seal means in relative sliding contact with said second primary seal means.

6. The joint assembly of claim 5 wherein said secondary seal means comprises a seal member extending annularly about said outer sloping surface of said inner spool means and disposed in a notch located downstream of said recess in said outer sloping surface.

7. The joint assembly of claim 1 wherein said outer spool means comprises a first upstream portion and a second downstream portion and means interconnecting said upstream and downstream portions and said upstream portion overlying said sloping surface of said inner spool means.

8. The joint assembly of claim 1 wherein said locking means comprises key means and including means for biasing said key means into locking engagement in said locked position.

9. The joint assembly of claim 8 wherein said key means and said bias means are disposed and operably associated with said outer spool means for locking engagement with annular slot means disposed in said sloping surface of said inner spool means when said temperature becomes colder whereupon said key means locates in said locked position.

10. The joint assembly of claim 1 including means for biasing said locking means which comprises key means into locking engagement in said locked position, said key means and said bias means are disposed and operably associated with one of said outer and inner spool means for locking engagement with slot means disposed in the other of said outer and inner spool means when said temperature becomes colder.

11. A joint assembly for interconnecting pipeline segments of a nonambient temperature pipeline through which cold liquid flows, comprising: inner spool means connected to a first of said segments and outer spool means connected to a second of said segments and at least partially overlying said inner spool means in coaxial relation thereto; said inner spool means having an outer circumferentially disposed sloping surface which increases radially outward of the pipeline axis in the direction of flow, and said outer spool means having an inner sloping surface which is complementary to and overlies said outer sloping surface of said inner spool means; primary seals means operably disposed between said sloping surfaces of said inner and outer spool means and arranged so that the seal provided by said primary seal means progressively increases in tightness as said inner and outer spool means move relative to each other into a locked position as said temperature proceeds from ambient to a colder temperature and means for maintaining said inner and outer spool means in said locked position.

12. A pipeline according to claim 12 including insulation means surrounding said pipeline segments along the length of said pipeline and a plurality of restraint means located between said pipeline segments and the periphery of said pipeline and longitudinally spaced along said pipeline with at least one of said joint assemblies disposed between consecutive ones of said restraint means for compartmentalizing said insulation.

13. In a pipeline for the transport of low temperature products therethrough, comprising a plurality of interconnected pipeline segments and said pipeline being characterized by ambient temperature conditions, in combination with joint assemblies for interconnecting said pipeline segments, each of said joint assemblies comprising inner spool means connected to said upstream segment and outer spool means connected to said downstream segment, said outer spool means at least partially overlying said inner spool means in coaxial relation thereto, said inner spool means having an outer sloping surface which increases radially outward relative to the axis of said interconnected pipeline segments and said outer spool means having an inner sloping surface which is complementary to said outer sloping surface and adapted to form a liquid tight seal therewith, primary seal means operably disposed between said sloping surfaces of said inner and outer spool means and key means disposed with one of said inner and outer spool means, said key means being disposed in a first position and key slot receiving means disposed with the other of said inner and outer spool means in a second position spaced from said key means in said first position, said key means biased for urging said key means toward said other of said inner and outer spools whereupon said key means lockingly engages said key receiving slot and the seal provided by said primary seal means progressively increases in tightness as said inner and outer spool means move relative to each other when said pipeline is cooled down from ambient temperature to a lower temperature.

14. A pipeline according to claim 14 including insulation means surrounding said pipeline segments along the length of said pipeline and a plurality of restraint means located between said pipeline segments and the periphery of said pipeline and longitudinally spaced along said pipeline with at least one of said joint assemblies disposed between consecutive ones of said restraint means, for compartmentalizing said insulation.

15. In a pipeline for the transport of low temperature products therethrough, comprising a plurality of interconnected pipeline segments and said pipeline being characterized by ambient temperature conditions, in combination with joint assemblies for interconnecting said pipeline segments, each of said joint assemblies for interconnecting comprising inner spool means connected to a first pipeline segment and outer spool means connected to a second pipeline segment, said outer spool means at least partially overlying said inner spool means in coaxial relation thereto, said inner spool means having an outer sloping surface which increases radially outward relative to the axis of said interconnected pipeline segments and said outer spool means having an inner sloping surface which is complementary to said outer sloping surface and adapted to form a liquid tight seal therewith, primary seal means operably disposed between said sloping surfaces of said inner and outer spool means being constructed and arranged such that said primary seal means becomes tighter as said inner and outer spool means contract as the pipeline temperature is cooled down from ambient temperature to a lower temperature and means for maintaining said inner and outer spool means in their relative positions at said lower temperature.

16. A pipeline according to claim 18 including an outer casing surrounding said insulation and wherein said restraint means comprises a truncated conically-shaped annular plate secured at its inner and outer edges circumferentially to said pipeline segment and said outer casing.

17. A pipeline according to claim 16 including insulation means surrounding said pipeline segments along the length of said pipeline and a plurality of restraint means located between said pipeline segments and the periphery of said pipeline and longitudinally spaced along said pipeline with at least one of said joint assemblies disposed between consecutive ones of said restraint means for compartmentalizing said insulation.

18. In a pipeline for the transport of low temperature products therethrough, comprising a plurality of interconnected pipeline segments and said pipeline being characterized by ambient temperature conditions, in combination with joint assemblies for interconnecting said pipeline segments, each of said joint assemblies for interconnecting comprising inner spool means connected to a first pipeline segment and outer spool means connected to a second pipeline segment, said outer spool means at least partially overlying said inner spool means in coaxial relation thereto, said inner spool means having an outer sloping surface which increases radially outward relative to the axis of said interconnected pipeline segments and said outer spool means having an inner sloping surface which is complementary to said outer sloping surface and adapted to form a liquid tight seal therewith, primary seal means operably disposed between said sloping surfaces of inner and outer spool means being constructed and arranged such that said primary seal means becomes tighter as said inner and outer spool means contract as the pipeline temperature is cooled down from ambient temperature to a lower temperature and means associated with said inner and outer spool means for maintaining said spool means in locked engagement when said pipeline is at a temperature other than ambient temperature and accommodating any further contraction movement in said pipeline.

19. A pipe line according to claim 18 wherein a single one of said joint assemblies is located between consecutive ones of said restraint means.

* * * * *